US008948831B2

(12) United States Patent  (10) Patent No.: US 8,948,831 B2
Stemmle et al.  (45) Date of Patent: Feb. 3, 2015

(54) TRANSMISSION SYSTEM WITH A SUPERCONDUCTING CABLE

(75) Inventors: Mark Stemmle, Hannover (DE); Frank Schmidt, Langenhagen (DE); Rainer Soika, Hannover (DE); Beate West, Hannover (DE)

(73) Assignee: Nexans, Paris (FR)

( * ) Notice: Subject to any disclaimer, the term of this patent is extended or adjusted under 35 U.S.C. 154(b) by 788 days.

(21) Appl. No.: 13/099,420

(22) Filed: May 3, 2011

(65) Prior Publication Data

US 2011/0275521 A1     Nov. 10, 2011

(30) Foreign Application Priority Data

May 10, 2010    (EP) .................................... 10305487

(51) Int. Cl.
| H01B 12/02 | (2006.01) |
| H01L 39/02 | (2006.01) |
| H01B 12/16 | (2006.01) |

(52) U.S. Cl.
CPC ............... *H01B 12/02* (2013.01); *H01B 12/16* (2013.01); *Y02E 40/641* (2013.01); *Y10S 505/704* (2013.01)
USPC ........ 505/230; 505/704; 505/163; 174/125.1; 307/147

(58) Field of Classification Search
USPC ........ 505/163, 230, 231, 704; 174/15.4, 15.5, 174/124.1; 29/599
See application file for complete search history.

(56) References Cited

U.S. PATENT DOCUMENTS

| 2002/0019315 A1* | 2/2002 | Nassi et al. .................... 505/150 |
| 2005/0173149 A1* | 8/2005 | Gouge et al. ................ 174/125.1 |
| 2008/0191561 A1* | 8/2008 | Folts et al. ..................... 307/147 |
| 2009/0069188 A1* | 3/2009 | Allais et al. .................... 505/231 |

FOREIGN PATENT DOCUMENTS

| EP | 2017856 A1 * | 1/2008 | ............. H01B 12/08 |
| WO | 2004-013868 | 2/2004 | |

* cited by examiner

*Primary Examiner* — Stanley Silverman
*Assistant Examiner* — Kallambella Vijayakumar
(74) *Attorney, Agent, or Firm* — Sofer & Haroun, LLP

(57) ABSTRACT

A transmission system is provided with a superconductive cable having three phase conductors and a cryostat, surrounding the phase conductors, and encasing a hollow space, for conducting a cooling agent. For the three phase conductors, a common neutral conductor is provided, being made of electrically normally conducting material, carried out as insulating round conductor and placed outside the cryostat and next to it. The cryostat is made of a circumferentially enclosed, thermally insulated sheath.

1 Claim, 1 Drawing Sheet

TRANSMISSION SYSTEM WITH A SUPERCONDUCTING CABLE

RELATED APPLICATIONS

This application claims the benefit of priority to European Patent Application No. 10 305 487.0, filed on May 10, 2010, the entirety of which is incorporated herein by reference.

BACKGROUND

1. Field of the Invention

The invention relates to a transmission system with a superconductive cable having three phase conductors and a cryostat surrounding the phase conductors and encasing a hollow space for conducting a cooling agent, wherein a neutral conductor is present common to the three phase conductors, and wherein the cryostat is made of a circumferentially enclosed, thermally insulated sheath.

Such a transmission system is disclosed in WO 2004/013868 A2.

2. Description of the Prior Art

Superconductive cables have in today's technology electrical conductors of a composite material which contains ceramic material, which at sufficiently low temperatures changes over into the superconducting state. The electrical direct current resistance of an appropriately constructed conductor is zero with sufficient cooling as long as a certain current is not exceeded. Suitable ceramic materials are, for example, BSCCO (Bismuth-strontium-calcium-copper-oxide) as material of the first generation, or ReBCO (Rare-earth-barium-copper-oxide), particularly YBCO (Yttrium-barium-copper-oxide), as materials of the second generation. Sufficiently low temperatures for placing such materials into the superconducting state are, for example, between 67 K and 90 K. Suitable cooling agents are, for example, nitrogen, helium, neon and hydrogen or mixtures of these materials.

EP 2 017 856 A1 describes a superconductive electrical cable which has a conductor constructed as conductor rope of superconductive wires. The conductor is surrounded by a dielectric which is enclosed by a screen, or a return conductor, or a neutral conductor. The vein of the cable formed in this manner is arranged in a cryostat which consists of two pipes of metal arranged concentrically relative to each other and including a vacuum insulation. It is also possible to arrange three such veins in a cryostat for forming a three-phase system. The conductor can also be arranged directly in a cryostat which is surrounded by a dielectric and a screen.

In the known transmission system according to the above-mentioned WO 2004/013868 A2, the three-phase conductors are insulated relative to each other and arranged concentrically relative to each other. The neutral conductor is arranged with the inclusion of another insulating layer as fourth conductor concentrically around the three-phase conductor. The compact arrangement with four conductors of superconducting material in a cryostat is placed in a cryostat and is cooled during operation of the transmission system until the superconductivity is reached. The cryostat has dimensions whose sizes are adapted to this compact arrangement, including a sufficiently large hollow space for conducting the cooling agent therethrough.

OBJECTS AND SUMMARY

The invention is based on the object of simplifying the above-described transmission system.

In accordance with the invention, this object is met in that the neutral conductor is composed in the manner known per se of electrically normally conducting material and is arranged outside of the cryostat, and the neutral conductor is constructed as an insulated round conductor and is placed next to the cryostat.

Since, in this transmission system, the neutral conductor is located outside of the cryostat, it may consist of a material which is less expensive and electrically normally conducting, particularly of copper. Accordingly, during operation of the transmission system, only the three phase conductors within the cryostat have to be cooled. The measures required for this cooling can be reduced as compared to known systems because possible heating of the neutral conductor does not have to be taken into consideration. Such heating could be caused by a current produced due to an asymmetrical use of the three phase conductors, which would lead to alternating current loss. The corresponding heating or power loss would have to be compensated by the cooling plant which for this purpose would have to be designed for a cooling output which is higher than that of normal operation. By arranging the neutral conductor outside of the cryostat, it is possible to reduce the cooling power of the cooling plant to the normal operation for cooling the three-phase conductors. Since the dimensions of the cable are also smaller because of the neutral conductor located outside of the cryostat, the dimensions of the cryostat can also be made smaller and, thereby, produce a lower material requirement.

BRIEF DESCRIPTION OF THE DRAWINGS

Embodiments of the subject matter of the invention are illustrated in the drawings.

In the drawing.

DETAILED DESCRIPTION

Figures 1, 2:
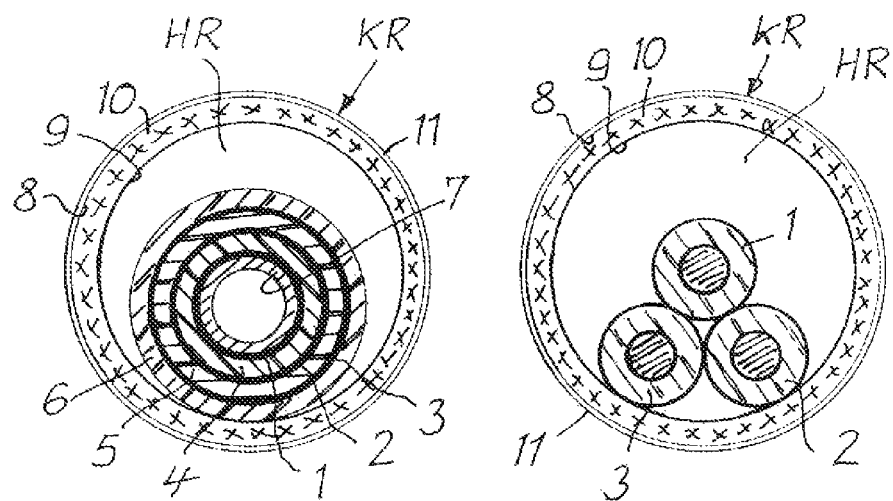
FIGS. 1 and 2 show cross-sectional views of two differently constructed transmission systems with a superconductive cable and a cryostat.

FIG. 1 shows a transmission system with a superconductive cable in cross section, wherein the transmission system has three superconductive phase conductors 1, 2 and 3 arranged concentrically relative to each other and insulated relative to each other with layers 4 and 5 of insulating material. Around the outer phase conductor 3 is placed another layer 6 of insulating material 6. The inner phase conductor 1 is arranged around a carrier 7 which, in the illustrated embodiment, is constructed as a pipe. The carrier 7 can also be constructed as a solid strand.

The superconductive cable is placed in a cryostat KR which also surrounds a hollow space HR for conducting the cooling agent therethrough. If the carrier 7 is a pipe, the cooling agent can be conducted additionally through this pipe. The cryostat KR is composed, for example, of two metal pipes 8 or 9, between which is arranged a vacuum insulation 10.

Outside of the cryostat KR, a neutral conductor 11, for example, of copper, common to all three phase conductors 1, 2 and 3 is provided. In the embodiment of the transmission system according to FIG. 1, the neutral conductor 11, composed, for example, of copper is provided. In the embodiment of the transmission system according to FIG. 1, the neutral conductor is placed around the cryostat KR. The neutral conductor 11 then has simultaneously the function of a screen.

This is also true in the embodiment of the transmission system according to FIG. 2, in which the three phase conductors 1, 2 and 3 are constructed as conductors which are separate from each other and each surrounded by insulation.

Figure 3:
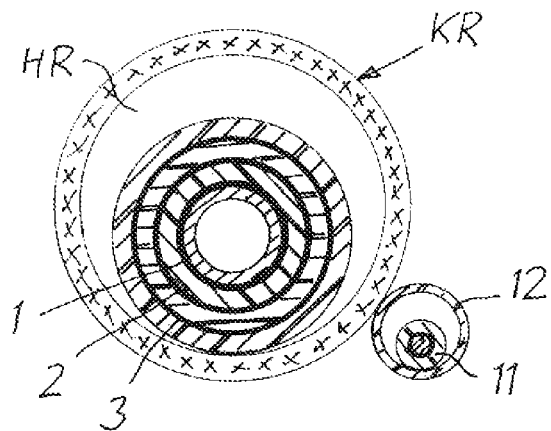
FIG. 3 shows a transmission system according to the invention.

Deviating from the arrangement of the neutral conductor 11 according to FIGS. 1 and 2, the neutral conductor is in accordance with FIG. 3 placed as an insulated round conductor next to the cryostat KR. It may then be arranged, for example, in a separate protective pipe 12 which can also be connected with the cryostat KR. The arrangement of the neutral conductor 11 according to FIG. 3 is applicable to both embodiments of the superconducting cable according to FIGS. 1 and 2.

The invention claimed is:

1. Transmission system comprising:
   a superconductive cable having three phase conductors; and
   a cryostat surrounding the phase conductors and enclosing a hollow space for guiding a cooling agent,
   wherein a neutral conductor, common to all three phase conductors, is provided, and
   wherein the cryostat includes a circumferentially enclosed, thermally insulated sheath,
   wherein the neutral conductor is an electrically normally conducting material and is arranged outside of the cryostat, and
   the neutral conductor is constructed as an insulated round conductor and is placed in a separate protective pipe.

* * * * *